3,349,795
DIAPHRAGM VALVE INCLUDING A
SNAP RING CONNECTION
Kunio Matsutani, Nagoya, Japan, assignor to NGK
Insulators, Ltd., Nagoya, Japan
Filed Apr. 19, 1965, Ser. No. 449,239
Claims priority, application Japan, Apr. 22, 1964,
39/31,151
2 Claims. (Cl. 137—375)

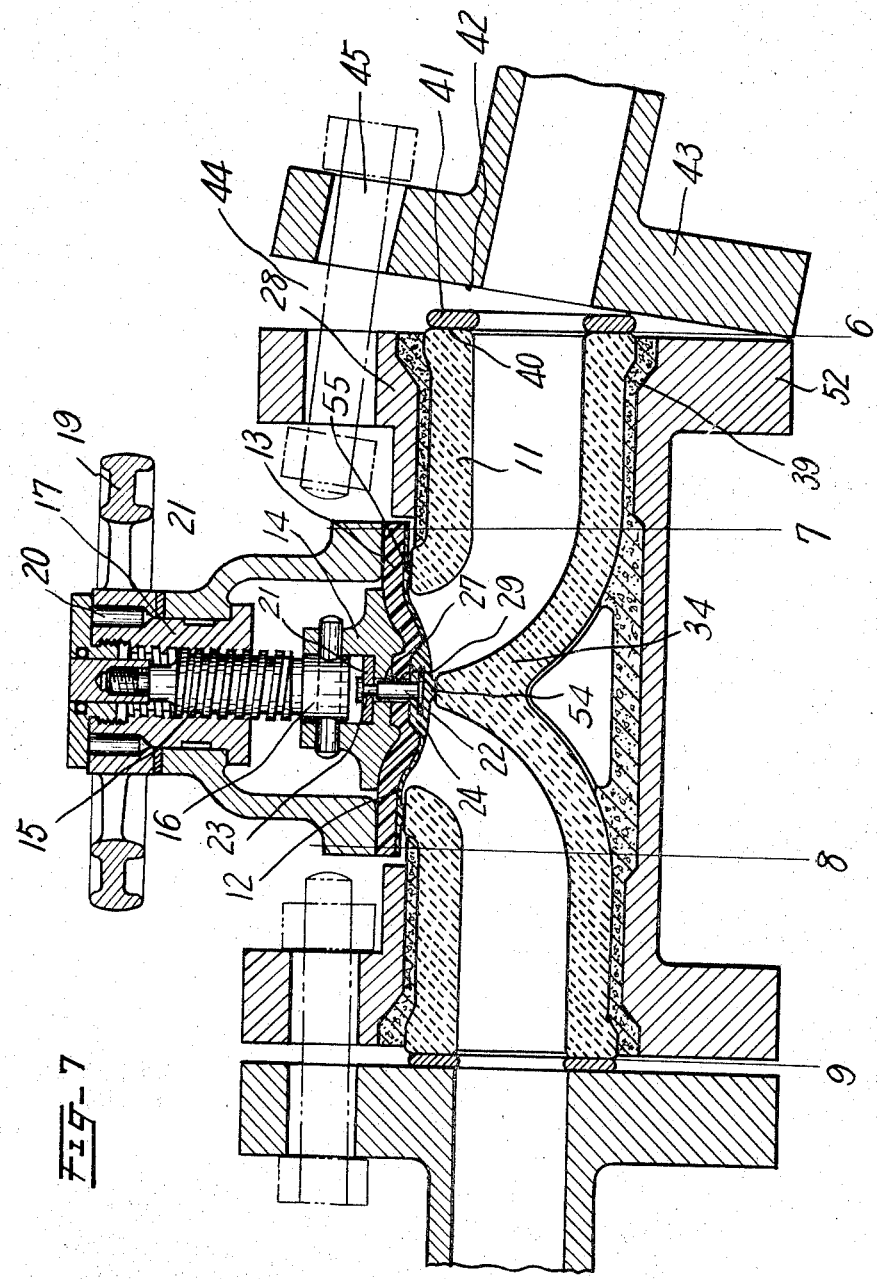

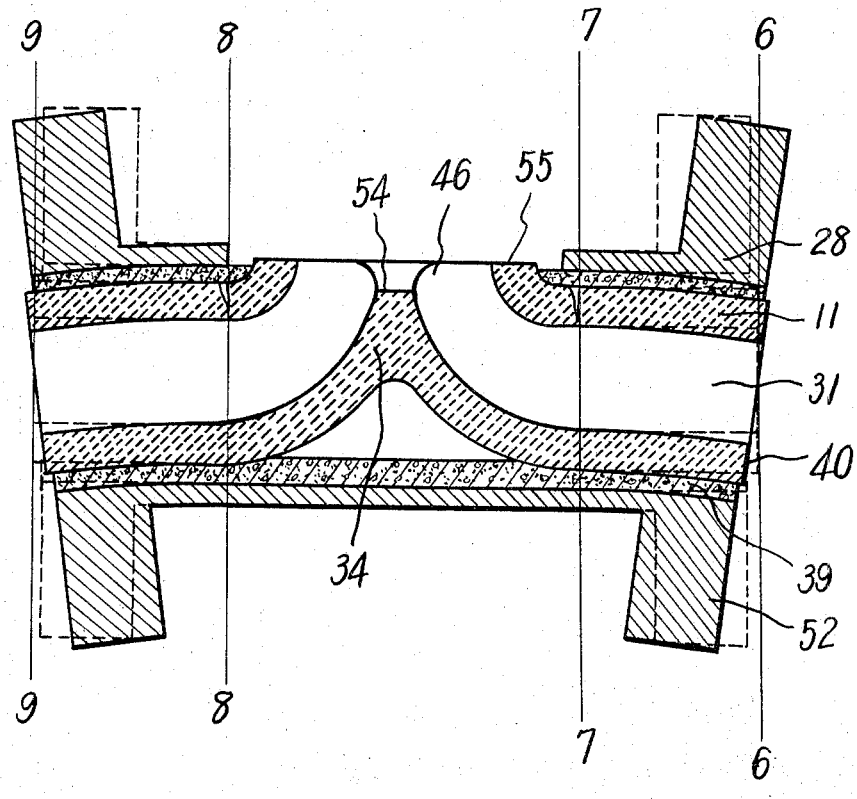

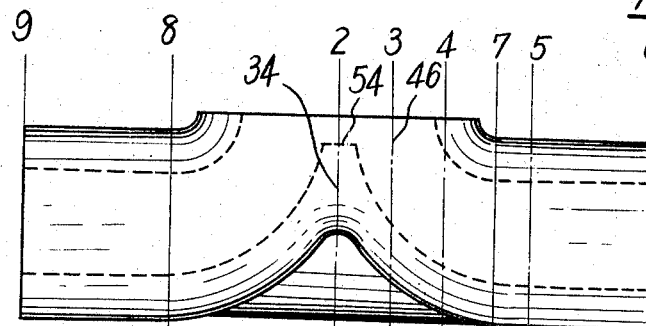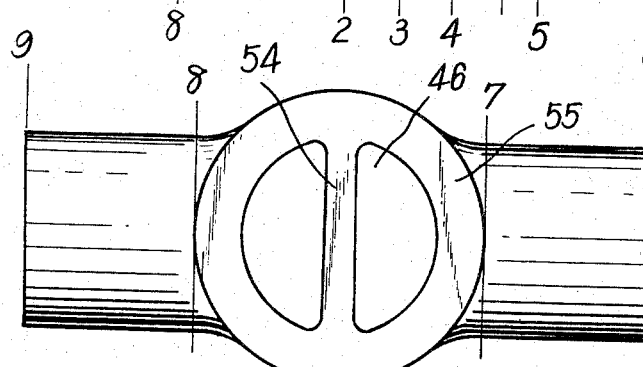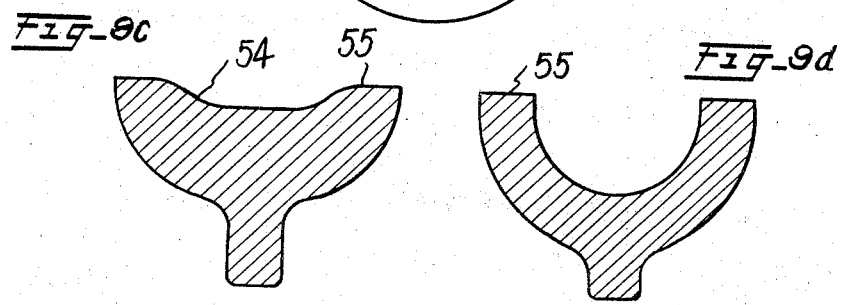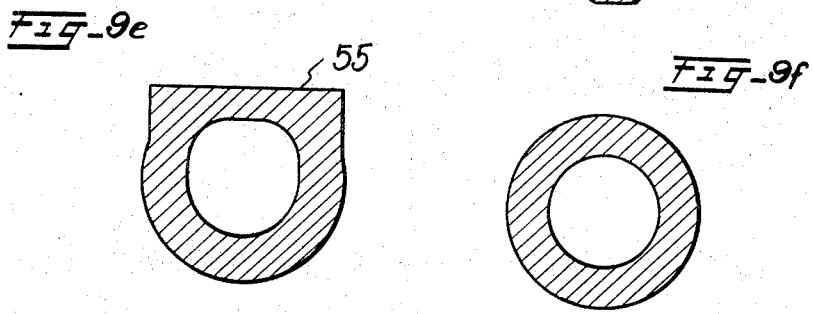

This invention relates to a diaphragm valve, more particularly to a novel diaphragm valve having simple construction made of a ceramic casing protected against abnormal external forces by a metallic cover consisting of two similar divided sections.

In conventional diaphragm valves, a diaphragm has been connected to a vertically moving compressor by means of a flanged screw stud having its flanged portion embedded in an embossed portion provided at the central part of the diaphragm on the compressor side thereof, and tightly engaging the screwed end of said stud with a tapped hole defined in the lower center portion of the compressor. Said conventional manner of fastening the diaphragm to the compressor has disadvantage in that when the compressor is lowered to close the valve by depressing said diaphragm against the upper surface of a weir provided in the valve, said stud rigidly fastened to said compressor could cause excessive strains in that portion of the diaphragm which is just underneath the flanged portion of said stud, and in fact, said portion of the diaphragm has been broken more quickly than other portions.

In order to obviate said difficulty, it has been proposed to release the rigid connection between the stud embedded in the diaphragm and the compressor when the diaphragm is pressed against the upper surface of the weir, while keeping other operation such as to lower the diaphragm when the compressor is lowered for closing the valve and to raise the diaphragm when the compressor is raised for opening the valve. As a device embodying the above principle of releasing said rigid connection between the stud and the compressor when the diaphragm depressed, special construction of the compressor has been used, wherein a sleeve nut having a flange at one end thereof is inserted loosely into a hole provided in the lower central portion of the compressor, said hole in the compressor having a diameter smaller than the outside diameter of the flanged portion of the sleeve nut but larger than that of the cylindrical portion of the sleeve nut so that the entire sleeve nut depends by itself within said hole of the compressor in a slidable manner with the flanged portion thereof being supported by the upper peripheral edge of said hole, and the screw threaded portion of said stud is screwed into the tapped hole of said sleeve nut to connect the diaphragm with the compressor. Such a construction has disadvantage in that the screw engagement between the stud and the sleeve nut becomes loose after repeated closing and opening operations of the valve, and sometimes the sleeve nut is separated from said stud. Even if some means are provided in the sleeve nut to prevent undesirable rotation thereof for the purpose of eliminating the disengagement of the sleeve nut from the stud in said construction of the valve, it has been difficult to insert the stud into the sleeve uniformly for each stud and to provide the best alignment of the diaphragm with the compressor for each valve, due to the fact that the angular position of the stud when the screw is tightened to the end is different for each stud.

The principal object of the invention is to provide an improved diaphragm valve which can resist the breakage of the ceramic valve casing due to abnormal external force applied thereto.

For a better understanding of the invention, reference is taken to the accompanying drawings, in which FIG. 1a is a longitudinal sectional view illustrating a diaphragm valve according to the invention when closed;

FIG. 7 is a longitudinal sectional view of the diaphragm valve illustrating a manner of connecting a flanged pipe thereto;

FIG. 8 is a longitudinal sectional elevation of the valve body and valve casing made of ceramic material illustrating the flanges being bent by an external force;

Figure 10:
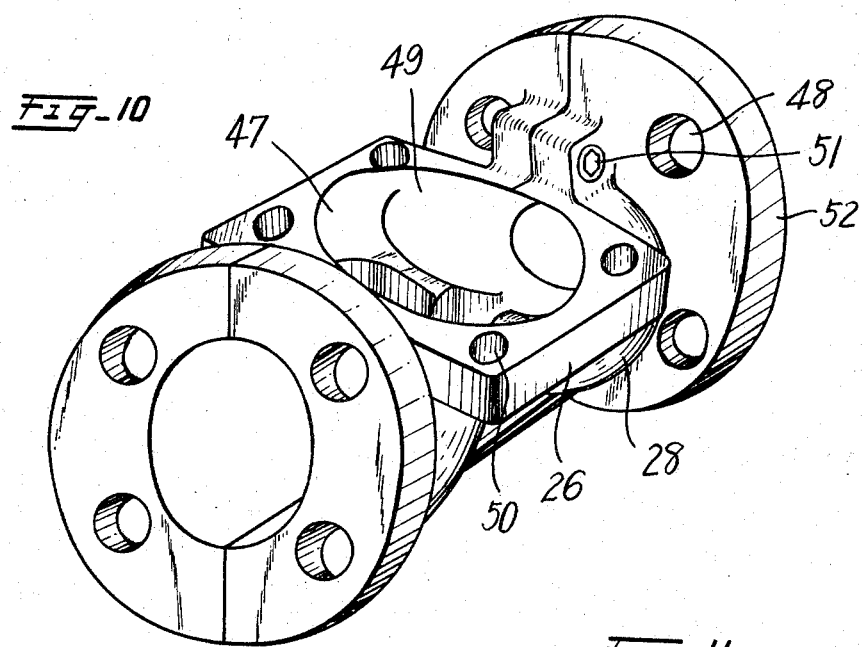
Figure 11:
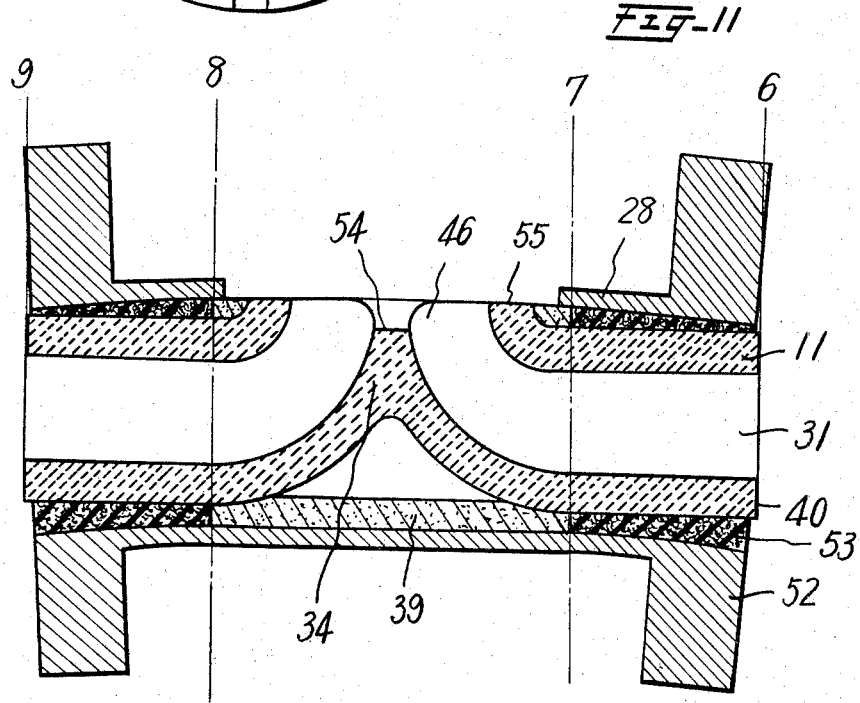

FIGS. 9a to 9f show the ceramic valve casing of the diaphragm valve, wherein FIG. 9a is a side view of the casing; FIG. 9b a plan view of the casing; FIG. 9c a sectional view taken on the line 2—2 of FIG. 9a; FIG. 9d a sectional view taken on the line 3—3 of FIG. 9a; FIG. 9e a sectional view taken on the line 4—4 of FIG. 9a; and FIG. 9f a sectional view taken on the line 5—5 of FIG. 9a;

FIG. 10 is a perspective view showing the metallic cover for the ceramic casing; and FIG. 11 is a longitudinal vertical sectional view of the ceramic casing embodying the invention.

Figure 1A:
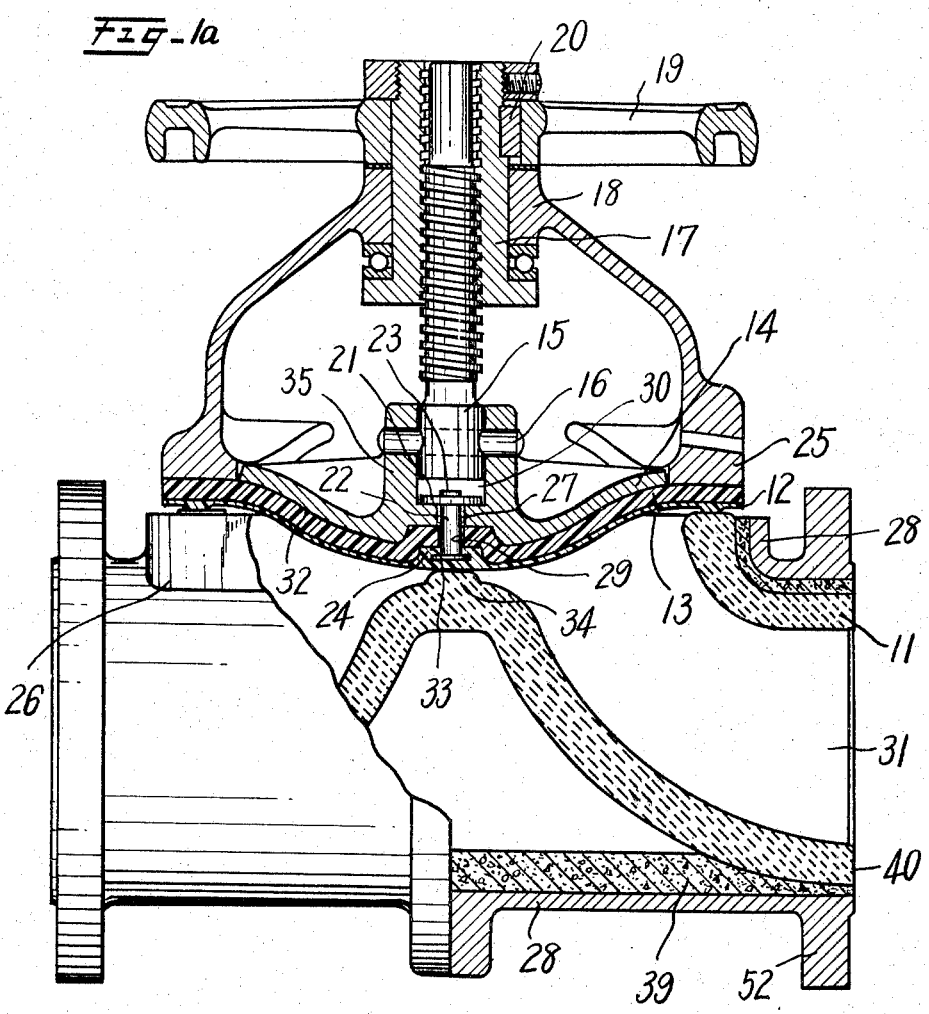
FIG. 1b is a longitudinal sectional view illustrating the valve when opened.
Figure 1B:
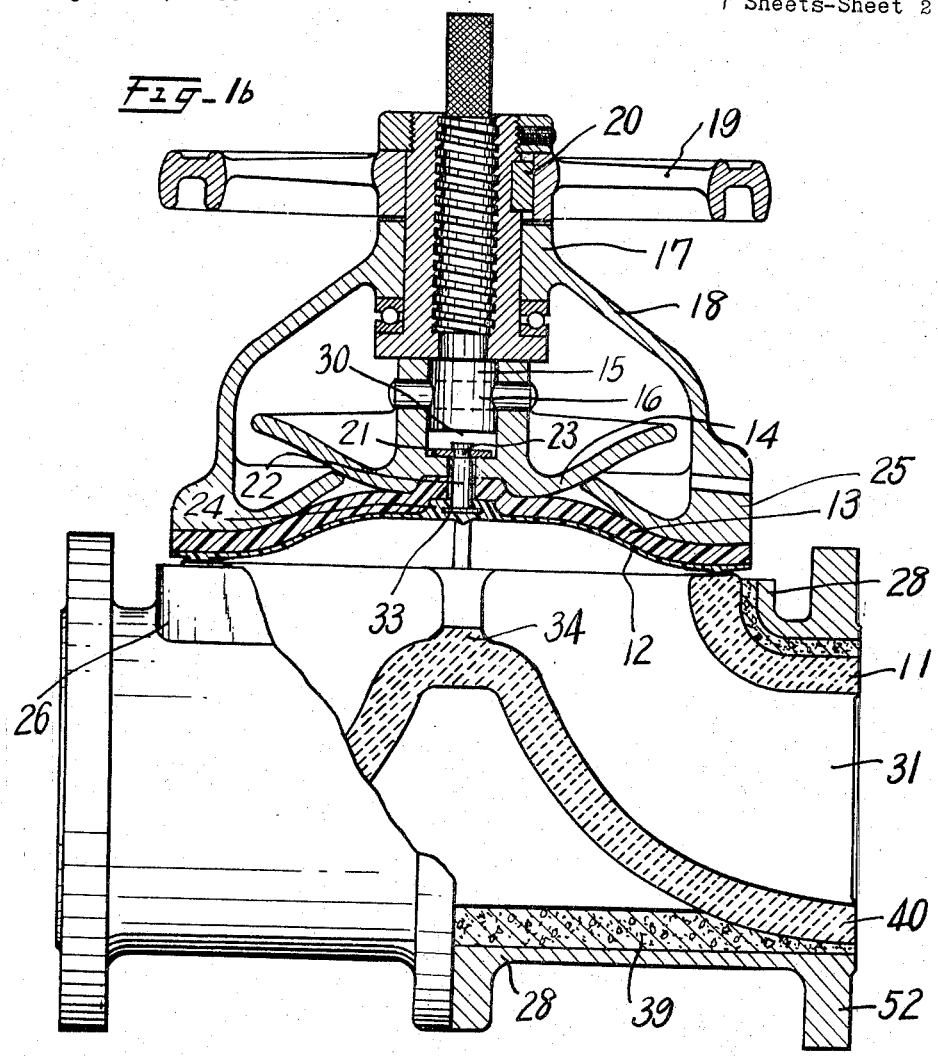

Referring to FIG. 1, 11 designates the valve casing made of usual acid-proof ceramic and protected by a metallic cover 28 separable into two equal similar sections in a known manner. A weir 34 is formed at the middle portions of the valve casing 11 normal to the longitudinal direction of the fluid passage 31 and to that of fluid stream. The diaphragm 12 is to be urged against the top surface of the weir 34 when the valve is closed and separated therefrom when the valve is opened.

The details of the construction of the ceramic valve casing 11 are illustrated in FIGS. 9a to 9f, wherein the weir 34 having an arcuate top surface 54 is formed across the middle portion of the fluid path 31 perpendicular to the longitudinal line of said fluid path 31, which penetrates through the ceramic valve casing 11, curving downwards from said top surface 54 symmetrically towards both sides, and a circular opening 46 having a diameter corresponding to a vertical projection of said top surface 54 is provided at the middle top portion of the ceramic valve casing 11 in such a manner that the annular upper peripheral surface 55 of said circular opening 46 is made to contact with said top surface 54 of the weir along a smoothly curved continuous plane and the diaphragm 12 is situated to be urged uniformly against said top surface 54 of the weir 34 along said smoothly curved continuous plane by means of a compressor 14.

The diaphragm 12 is made of polytetrafluoroethylene resins which have little flexibility, and accordingly such a resin is made into a thin membrane and provided with a lining 13 made of elastic materials, such as rubber, to receive compressive force of the compressor 14. The diaphragm 12 provided with a rubber lining 13 is fixed tightly and sealed between the flanged portion 25 of the valve bonnet 18 and the flanged portion 26 of the valve casing 11 by means of bolts. The compressor 14 is provided with radially disposed several arms to act as guides and as pressers of the diaphragm 12, and a boss 35 is formed at the central portion of the compressor, and the valve rod 15 is fitted into a recess 30 of the boss 35 and fixed thereto by means of a cross pin 16. The upper part of the valve rod 15 is screw threaded to engage with the tapped bushing 17, which latter is rotatably fitted onto the valve bonnet 18 and rigidly secured to a handle 19 by a key 20, thereby the compressor 14 is moved vertically by rotating the handle 19 in conjunction with the valve rod 15.

Figure 2:
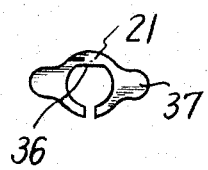
FIG. 2 is a plan view of a snap ring to retain a stud embedded in a diaphragm within the compressor.
Figure 3A:
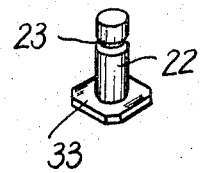
FIG. 3a is a perspective view of the stud.
Figure 3B:
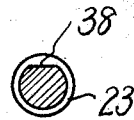
FIG. 3b is a transverse sectional view of the upstanding portion of stud.
Figures 4A, 4B:
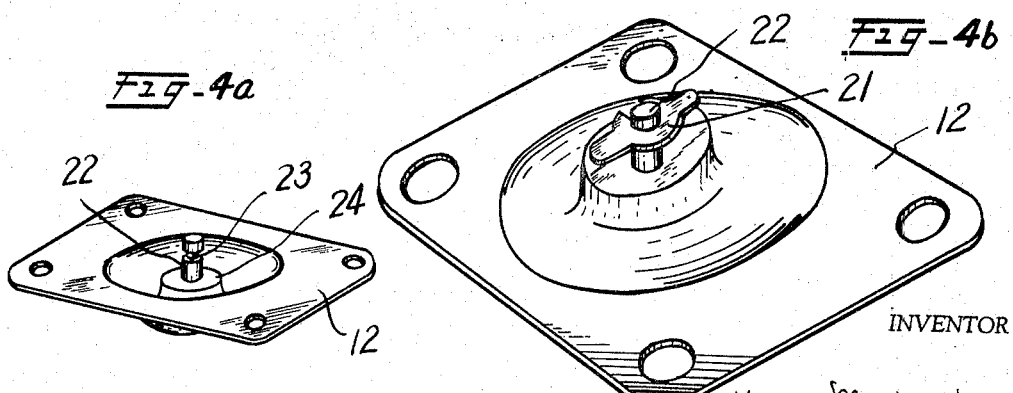
FIG. 4a is a perspective view illustrating the diaphragm with the stud as shown in FIGS. 3a and 3b embedded therein.
FIG. 4b is a perspective view of the diaphragm with said stud mounted with the snap ring.
Figure 5:
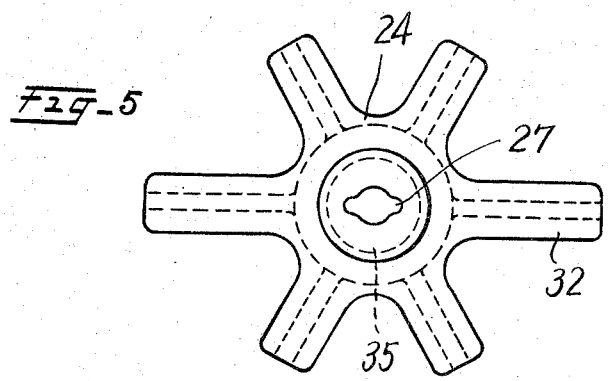
FIG. 5 is a bottom view of the compressor.

A stud 22 shown in FIG. 3a, provided with a flange 33 on its one end and an annular groove 23 close to the other end thereof for receiving a snap ring 21 shown in FIG. 2, is embedded in the embossed portion 24 at the central portion of the diaphragm 12 and shaped as shown in FIG. 4a. A rubber lining 13 is overlapped on the diaphragm while allowing said stud 22 projecting from the diaphragm to penetrate through a hole 29 provided at the embossed portion of the rubber lining 13, and thereafter the snap ring 21 is inserted into said annular groove 23. It is preferable to fit the snap ring 21 to the stud 22 to prevent relative rotation. FIGS. 3a and 3b illustrate a means for such non-rotating engagement, wherein a flat notch 38 is provided at a part of the annular groove 23 and a corresponding flat portion 36 defined at a part of the inner circular periphery of the snap ring 21 is to engage with said flat notch 38 when the snap ring 21 is inserted into the annular groove 23, thereby the undesirable rotation of the snap ring in the annular groove is prevented. FIG. 4b illustrates a diaphragm and the stud fitted with the snap ring.

In order to connect the diaphragm 12 to the compressor 14 by means of the stud 22, the snap ring 21 is provided with a pair of wings 37 extending from mutually opposite sides of the ring. For joining the diaphragm 12 to the compressor 14, the stud 22 extending from the diaphragm 12 through the rubber lining 13 and mounted with the snap ring 21 is to be inserted from lower side into an opening 27 defined in the bottom wall of the recessed portion 30 of the compressor 14 until the snap ring 21 fits onto the stud 22 comes above the upper surface of said bottom wall of the recessed portion 30, thereafter the diaphragm 12 and the stud 22 extending therefrom are turned around about 90 degrees horizontally with respect to the compressor 14 so that said wings 37 may be supported by said upper surface of the bottom wall of the recessed portion 30, then the diaphragm 12 is so aligned with the operative direction of the compressor 14 as to cause the diaphragm 12 to move responsive to the operation of the compressor 14. The snap ring 21 thus placed on the upper surface of the bottom wall in the recessed portion 30 of the compressor 14 cannot be removed from the compressor unless the diaphragm 12 and the stud 22 are turned around once again to the original angular position.

When the peripheral edges of the diaphragm thus connected to the compressor are secured to the valve casing in the aforementioned manner, the compressor 14 is not allowed to rotate with respect to the flanged portion 25 of the valve bonnet 18, and thereby as the compressor 14 is raised the diaphragm 12 is also raised without any failure by means of the connection through said stud 22.

When the diaphragm 12 is lowered downward, the stud 22 does not contribute directly to the transmission of an operative force through the compressor 14, and in fact, the diaphragm 12 is pressed downward by the entire surface of the compressor 14 and not by the limited area of the stud.

The breakage of valve casings due to abnormal forces applied from outside has been also noticed with the conventional diaphragm valves. The valve casing, for example the cylindrical ceramic valve casing 11 in FIGS. 7 and 8, is always subjected to stresses due to fluid pressure within the valve as well as stresses due to mechanical forces transmitted through piping. Valves are usually constructed with sufficient mechanical strength to withstand said stresses due to internal fluid pressure, however, sometimes valves were broken due to an enormous bending force acting on the entire valve from outside, for example a breakage occurs at such portions as shown by 6 to 7 and 9 to 8 in FIG. 8. Such external mechanical forces acting on the valve are generated mainly due to following reasons:

Firstly, connections of adjacent flanges could be a cause of such a mechanical force, namely if the surfaces of flanges to be joined, for example 40 to 42 in FIG. 7, are contacted each other exactly in parallel through a suitable packing, for example 41 of FIG. 7, and further if flange bolts 45 are tightened uniformly then there will be no bending moment acting on the valve, whereas, in general, such ideal joints are not realized and two adjacent flange surfaces to be joined are not in parallel in a very accurate sense, for instance, as shown exaggerated by 40 and 42 in FIG. 7, and those portions of adjacent flange surfaces which are separated farther than the rest of the flange surfaces are to be pulled together more strongly than the rest of the flange surfaces by means of flange bolts, for instance 45 in FIG. 7, to obtain the tight contact of two flanges. In applying larger tightening forces to said portions of the flange surfaces which are separated each farther than the remaining portions of flanges by means of flange bolts in order to pull said portions closer together, bending moment is produced in certain portions of the valve, for example the portion 6–7 in FIGS. 7 and 8. It is also extremely difficult to tighten all flange bolts exactly to the same extent, and in fact, it is inevitable to have so-called unbalanced tightening to some extent. Such unbalanced tightening also causes bending moments on the valve casing. Secondly, a stress produced at a certain point of the pipe system away from the valve could be also a cause of a bending moment at the valve casing.

Another object of the invention is to obviate said difficulties by providing a novel diaphragm valve having simple construction using ceramic valve casing.

According to the invention, the diaphragm is joined to the compressor in correct relations without using a sleeve nut having a flange, and the breakage of said ceramic valve casing due to abnormal external forces is prevented by covering said ceramic valve casing with a metallic cover consisting of two halves and further by filling the gap between the ceramic valve casing and the metallic cover with fillers such as cement mortars and resin mortars.

The diaphragm valve of the invention is provided with a metallic cover 28 separable into two similar sections as shown in FIG. 10 to cover the ceramic valve casing, said metallic cover 28 having flanges 52 for joining adjacent pipes and a flange 26 for mounting the bonnet 18 at the bonnet flange 25 as shown in FIG. 1a, said flanges being cast as integral parts of the metallic cover 28, and the gap between the ceramic valve casing 11 and the inner surface of the metallic cover 28 is filled in by filling materials 39 such as cement mortar and resin mortar as illustrated in FIG. 1a, thereby the ceramic valve casing 11 is fixed securely inside the metallic cover 28 after said filling materials are hardened.

Figure 6:
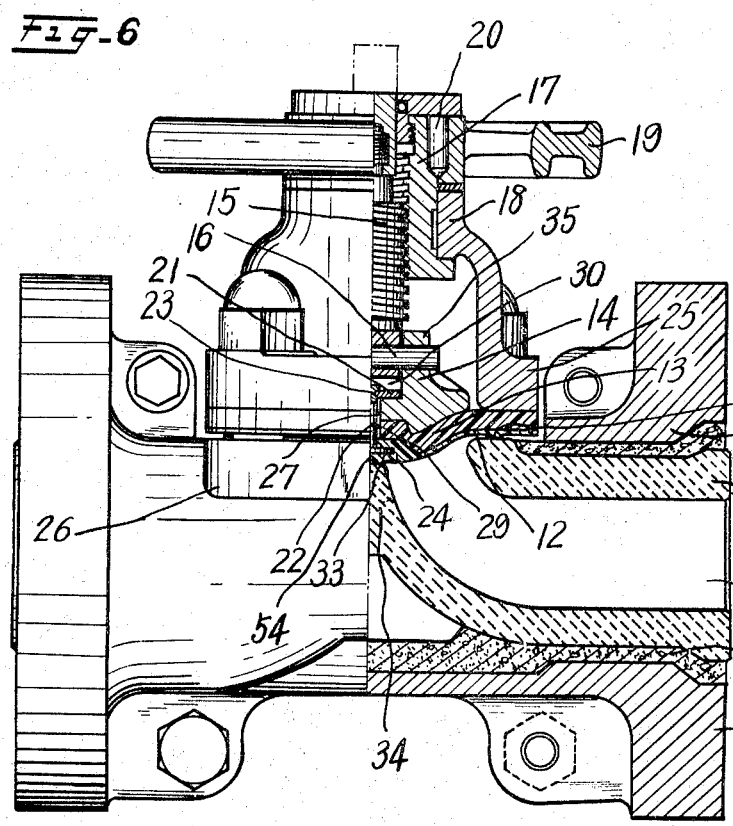
FIG. 6 is a side view of the ceramic valve casing embodying the invention with one half thereof in longitudinal section.

Said metallic cover 28 can be separated into two similar sections either along the direction parallel to the axial direction of the fluid flow as shown in FIGS. 6 and 10, or along a direction normal to said axial direction of the fluid flow as shown in FIG. 1a. After the ceramic cylindrical valve casing 11 is combined with the metallic cover 28 and fixed by the filling materials 39 placed in the gap, those portions of the valve which are subjected to the largest stresses and strains when a bending moment is applied thereto are sections 6–7 and 9–8 as illustrated in FIG. 8 regardless of the manner of dividing the metallic cover 28. Such distribution of the stresses and strains is due to the fact that the metallic cover 28 is apt to be bent when an external bending force is applied thereto because of the opening 49 shown in FIG. 10, and also to the fact that the thickness of the metallic wall at sections 6–7 and 9–8 cannot be increased beyond a certain level because of the limitation in the outside diameter of the valve cylinder for the sake of providing flanges of standard dimensions, on the other hand, the sections 8–7 of the ceramic valve casing 11 is subjected only to the compressive force and practically no bending moment acts on said section 8–7 due to the fact that the valve casing walls in said section extend gradually toward the upper center portion of the valve as shown in FIGS. 9c, 9d and 9e, and in addition, the dimension is not limited and the sectional area of the peripheral wall can be increased as desired to meet the required mechanical strength.

According to the invention, the ceramic valve casing 11 is rigidly fixed to the metallic cover 28 only in the section 7–8 in view of said distribution of stresses and strains, while the gaps between the ceramic valve casing and the metallic cover in the sections 6–7 and 9–8 are either left unfilled as free space or filled with flexible filling materials 53 such as rubber, asbestos, sponges, cottons, etc. as shown in FIG. 11.

The salient features of the diaphragm valve of the invention can be summarized as follows:

In order to connect the diaphragm 12 to the compressor 14, the flat notch 38, which is provided at a part of the annular groove 23 formed at the upper end portion of the stud 22 embedded in the center embossed portion of the diaphragm 12, is brought into engagement with the flat portion 36 defined at a part of the inner circular periphery of the snap ring 21 having a pair of wings 37, which ensures non-rotating engagement between the snap ring 21 and the stud 22. This provides the advantage that said wings 37 enable the snap ring 21 to serve as a stop ring during operation of the diaphragm valve. That is, the snap ring 21 is firmly secured to the stud 22 irrespective of the configuration of the recessed portion 30 of the compressor 14 and can not be inadvertently removed from the compressor 14. Thus, if the snap ring 21 is fitted onto the stud 22 and then the diaphragm 12 is turned 90° with respect to the compressor 14, the wings 37 can be firmly supported by the upper surface of the bottom wall of the recessed portion 30 and serve as stop means during operation of the diaphragm valve.

In the embodiment of the invention described in the foregoing, a rubber lining 13 was provided on the diaphragm 12, however, it will be apparent to those skilled in the art that the invention can be also applied to a diaphragm valve without lining.

According to the diaphragm valve of the invention, due to the fact that the rigid connection between the ceramic valve casing and the metallic cover is limited to the central portion of the valve, when a bending force is applied to the flange 52 from the outside as above described, the metallic cover 28 only is bent and substantially no bending effect on the ceramic valve casing and especially in the sections on the lines 7 and 8 of the ceramic valve casing, the thickness of the casing walls are gradually increased toward the central portion of the valve as shown in FIGS. 9a to 9f so that the ceramic valve casing can be so secured within the metallic cover as to withstand against external forces of all directions, and the stresses acting on the ceramic valve casing under said conditions are limited to compressive stress only.

The invention thus provides diaphragm valves having excellent mechanical strengths, and represents advanced significant contribution to the art.

What I claim is:

1. A diaphragm valve which comprises a valve body provided with a weir at the center top portion thereof normal to the direction of the fluid passage through said valve, a diaphragm made of resilient material to tightly contact with the upper surface of said weir covering said fluid passage, a compressor secured to a valve spindle to be operated thereby to close and open the valve by depressing said diaphragm against said weir and releasing the diaphragm therefrom respectively, a stud having a lower flanged end embedded in a boss formed at the central portion of said diaphragm in order to secure said diaphragm to said compressor rigidly, said stud being provided with an annular groove near the top end thereof, a snap ring having a pair of wings and formed to engage said annular groove provided on said stud, the bottom wall of the recess having an opening for receiving said valve spindle and formed to allow said snap ring secured to said stud to pass therethrough, the connection between said diaphragm and said compressor being established by turning said snap ring secured to said stud when projected through said opening in said bottom wall of said recess to have both wings of the snap ring rest on the upper surface of said bottom of the recess, thereby said diaphragm is operated in conjunction with said compressor, a valve casing made of ceramic material, a flanged metallic cover divided into two symmetrical sections secured together by means of the flanges and surrounding said casing so as to leave a gap there between, a central portion of said gap being filled with a relatively rigid packing and adhering material to rigidly connect said ceramic casing to the metallic cover, and a relatively flexible packing materail filled into end portions of said gap between the casing and the cover in the proximity of inlet and outlet openings of the valve to limit the effects of external bending forces acting on the valve to said metallic cover only for protecting said ceramic casing against damage liable to be caused by heavy external force.

2. A diaphragm valve which comprises a valve body provided with a weir at the center top portion thereof normal to the direction of the fluid passage through said valve, a diaphragm made of resilient material to tightly contact with the upper surface of said weir covering said fluid passage, a compressor secured to a valve spindle to be operated thereby to close and open the valve by depressing said diaphragm against said weir and releasing the diaphragm therefrom respectively, a stud having a lower flanged end embedded in a boss formed at the central portion of said diaphragm and having an annular groove with a flat notch at a part thereof near the top end of said stud, a snap ring having a flat portion formed at a part of the inner circular periphery thereof to engage with said flat notch, said snap ring including a pair of wings extending from mutually opposite sides thereof, and wall means including a bottom wall associated with said compressor to define a recess for receiving said valve spindle, said bottom wall being provided with an opening having an elongated configuration corresponding to the configuration of said snap ring, the connection between said diaphragm and said compressor being established by turning the diaphragm provided with the stud, engaged with the snap ring, 90° with respect to the compressor and engaging both side wings of the snap ring with the upper surface of the bottom of the recess of the compressor.

References Cited

UNITED STATES PATENTS

| | | | |
|---|---|---|---|
| 1,295,879 | 3/1919 | Flannery et al. | 85—8.8 X |
| 1,483,598 | 2/1924 | Runne | 85—8.8 |
| 2,892,613 | 6/1959 | Boteler | 251—331 |
| 3,134,571 | 5/1964 | Boteler | 251—331 |
| 3,206,530 | 9/1965 | Boteler | 251—368 X |

FOREIGN PATENTS

| | | |
|---|---|---|
| 1,044,271 | 6/1953 | France. |
| 901,185 | 7/1962 | Great Britain. |

M. CARY NELSON, *Primary Examiner.*

W. JOHNSON, A. ROSENTHAL, *Assistant Examiners.*